(12) United States Patent
Mochizuki et al.

(10) Patent No.: US 10,876,745 B2
(45) Date of Patent: Dec. 29, 2020

(54) AIR CONDITIONING REGISTER

(71) Applicant: TOYOTA JIDOSHA KABUSHIKI KAISHA, Toyota (JP)

(72) Inventors: Misako Mochizuki, Miyoshi (JP); Yuji Kariya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 15/633,042

(22) Filed: Jun. 26, 2017

(65) Prior Publication Data
US 2018/0128503 A1    May 10, 2018

(30) Foreign Application Priority Data
Nov. 7, 2016  (JP) ................. 2016-217250

(51) Int. Cl.
| F24F 1/00 | (2019.01) |
| F24F 1/0033 | (2019.01) |
| F24F 13/08 | (2006.01) |
| B60H 1/34 | (2006.01) |
| F24F 13/06 | (2006.01) |
| F24F 13/14 | (2006.01) |
| F24F 1/0059 | (2019.01) |

(52) U.S. Cl.
CPC ............ *F24F 1/0033* (2013.01); *B60H 1/34* (2013.01); *B60H 1/345* (2013.01); *F24F 1/0059* (2013.01); *F24F 13/06* (2013.01); *F24F 13/082* (2013.01); *F24F 13/14* (2013.01)

(58) Field of Classification Search
CPC ........ F24F 1/0033; F24F 1/0059; F24F 13/06; F24F 13/082; F24F 13/14; B60H 1/34; B60H 1/345; B60H 1/3457; H05K 7/20145; F02D 35/0076; F02M 7/22
See application file for complete search history.

(56) References Cited

U.S. PATENT DOCUMENTS

| 4,662,829 A * | 5/1987 | Nehring ................ F04B 43/06 |
| | | 417/395 |
| 9,152,191 B1 * | 10/2015 | Gardner .................. G06F 1/206 |
| 2006/0223430 A1 | 10/2006 | Shibata et al. |
| 2014/0254090 A1 * | 9/2014 | Gardner ............ H05K 7/20745 |
| | | 361/679.49 |
| 2016/0102884 A1 | 4/2016 | Terai et al. |
| 2017/0158029 A1 * | 6/2017 | Eltrop ................ B60H 1/00564 |

FOREIGN PATENT DOCUMENTS

| DE | 3908612 A1 | 9/1990 | |
| DE | 102007038212 A1 * | 2/2009 | ............ B60H 1/345 |
| DE | 102008006158 A1 * | 7/2009 | ............ B60H 1/345 |
| DE | 202010000678 U1 | 5/2010 | |
| JP | S59-157906 U | 10/1984 | |
| JP | H01-120043 U | 8/1989 | |

(Continued)

*Primary Examiner* — Steven S Anderson, II
(74) *Attorney, Agent, or Firm* — Oliff PLC

(57) ABSTRACT

An air conditioning register includes a tube and a blade. An inner side of the tube functions as a duct. The blade is located at an outer side of the tube. The blade moves to change a distance from the blade to a center axis of the tube. Movement of the blade presses a portion of the tube between two ends in an axial direction of the center axis from the outer side with the blade and changes the duct in shape.

7 Claims, 5 Drawing Sheets

(56) References Cited

FOREIGN PATENT DOCUMENTS

| JP | H05-083652 U | 11/1993 |
| JP | 2006-306365 A | 11/2006 |
| JP | 2008-080839 A | 4/2008 |
| JP | 2014-119246 A | 6/2014 |
| JP | 2016-78487 A | 5/2016 |

* cited by examiner

AIR CONDITIONING REGISTER

BACKGROUND OF THE INVENTION

The present invention relates to an air conditioning register.

Japanese Laid-Open Patent Publication No. 2014-119246 discloses an example of an air conditioning register installed in a vehicle. The air conditioning register includes a tube. The inner side of the tube functions as a duct. Air flows through the duct before being blown into the passenger compartment.

As shown in FIGS. 9 and 10, the register described in the document changes the mode in which air is blown out of an outlet 53 by changing the directions of movable fins 51 and 52 that are arranged in a duct 50. For example, when the movable fins 51 and 52 are arranged in a direction in which air flows through the duct 50 as shown by the solid line in FIG. 9, the spreading of the air blown out of the outlet 53 is limited. When the movable fins 51 and 52 are arranged orthogonal to the direction in which air flows in the duct 50 as shown in FIG. 10, the duct 50 is partially closed by the movable fins 51 and 52. This narrows the duct 50. Thus, the air flowing through the narrowed portion in the duct 50 spreads toward the outlet 53. This easily spreads the air blown out of the outlet 53. In this manner, the directions of the movable fins 51 and 52 are changed in the duct 50 to shift between a spot airflow mode that limits the spreading of the air blown into the passenger compartment and a diffusion airflow mode that facilitates the spreading of the air blown into the passenger compartment.

In the above air conditioning register, when air is blown out of the outlet 53 in the spot airflow mode, the movable fins 51 and 52 in the duct 50 interfere with the flow of air.

Fins interfere with the flow of air when the direction of air does not need to be changed not only in a structure in which the fins are used to switch between the spot airflow mode and the diffusion airflow mode but also in a structure in which the fins are arranged in a duct to adjust the direction of the air blown out of the outlet.

SUMMARY OF THE INVENTION

It is an object of the present invention to provide an air conditioning register that changes a mode of blowing air out of a tube into a passenger compartment and supplies air efficiently.

To solve the above problem, an air conditioning register according to a first aspect of the present invention includes a tube and a blade. An inner side of the tube functions as a duct. The blade is located at an outer side of the tube. The blade moves to change a distance from the blade to a center axis of the tube. Movement of the blade presses a portion of the tube between two ends in an axial direction of the center axis from the outer side with the blade and changes the duct in shape.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an air conditioning register of the present invention applied to an in-vehicle air conditioning register will now be described with reference to FIGS. 1 to 5.

Figure 1:
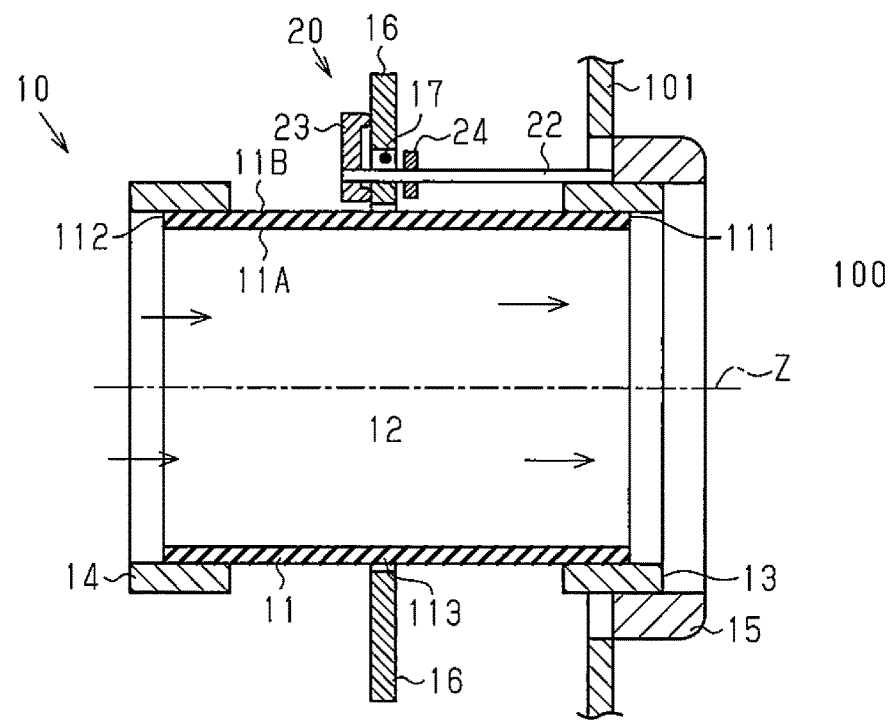
FIG. 1 is a cross-sectional view schematically showing an air conditioning register according to one embodiment of the present invention.
Figure 2:
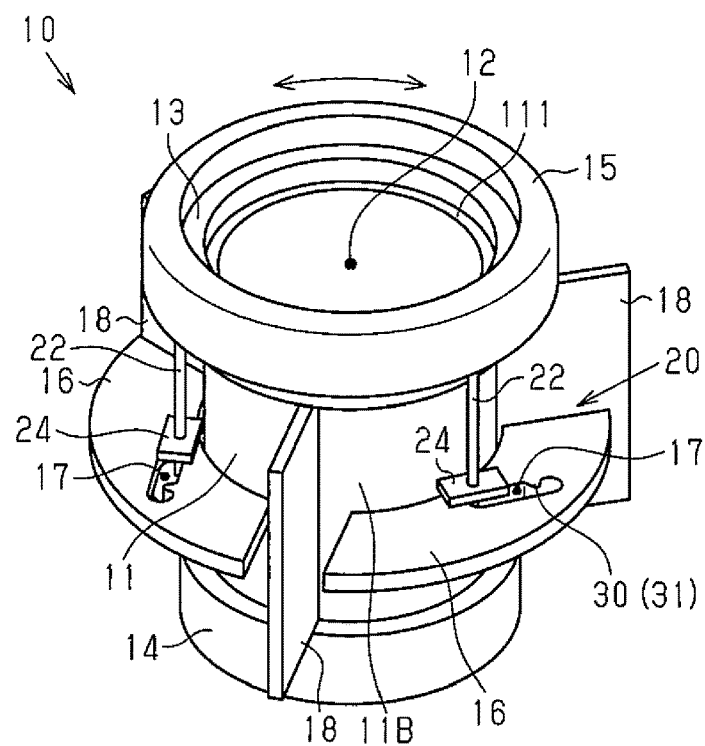
FIG. 2 is a perspective view showing the air conditioning register.

FIGS. 1 and 2 show an air conditioning register 10 that guides air flowing from an in-vehicle air conditioning device into a passenger compartment 100. As shown in FIGS. 1 and 2, the air conditioning register 10 includes a cylindrical tube 11. The inner side of the tube 11 functions as a duct 12 through which air flows from the air conditioning device. The tube 11 includes an inner circumferential surface 11A defining the duct 12. The tube 11 is formed from an elastic material such as elastomer.

Further, the air conditioning register 10 includes a ring-shaped first case member 13 and a ring-shaped second case member 14. The first case member 13 is fixed to an end 111 of the tube 11 serving as a first end that faces the passenger compartment 100. The second case member 14 is fixed to an end 112 of the tube 11 serving as a second end located at a side opposite to the passenger compartment 100. The first case member 13 is formed from a material that is less deformable than the tube 11. The entire circumference of the end 111 of the tube 11 is joined with the inner side of the first case member 13. Thus, the first case member 13 limits deformation of the end 111 of the tube 11. In the same manner, the second case member 14 is formed from a material that is less deformable than the tube 11. The entire circumference of the end 112 of the tube 11 is joined with the inner side of the second case member 14. Thus, the second case member 14 limits deformation of the end 112 of the tube 11.

The first case member 13 is supported by a panel member 101 that defines the passenger compartment 100. Air flows through the duct 12 of the tube 11 before being blown from the inner side of the first case member 13 into the passenger compartment 100.

An operation ring 15 serving as an operation member is arranged at an outer side of the first case member 13 in a radial direction. The operation ring 15 is located in the passenger compartment 100 so that an occupant can operate the operation ring 15. The operation ring 15 is rotated along an outer circumferential surface of the first case member 13 in a circumferential direction of the tube 11 as shown by the arrows in FIG. 2.

Three blades 16 are arranged at the outer side of the tube 11 in the radial direction. The three blades 16 are located at a middle position between the two case members 13 and 14 in an axial direction of the tube 11. The three blades 16 are spaced apart from one another in the circumferential direction around the tube 11. The portion of the tube 11 located at the same position in the axial direction as the blades 16 is referred to as the predetermined portion 113.

Figure 3:
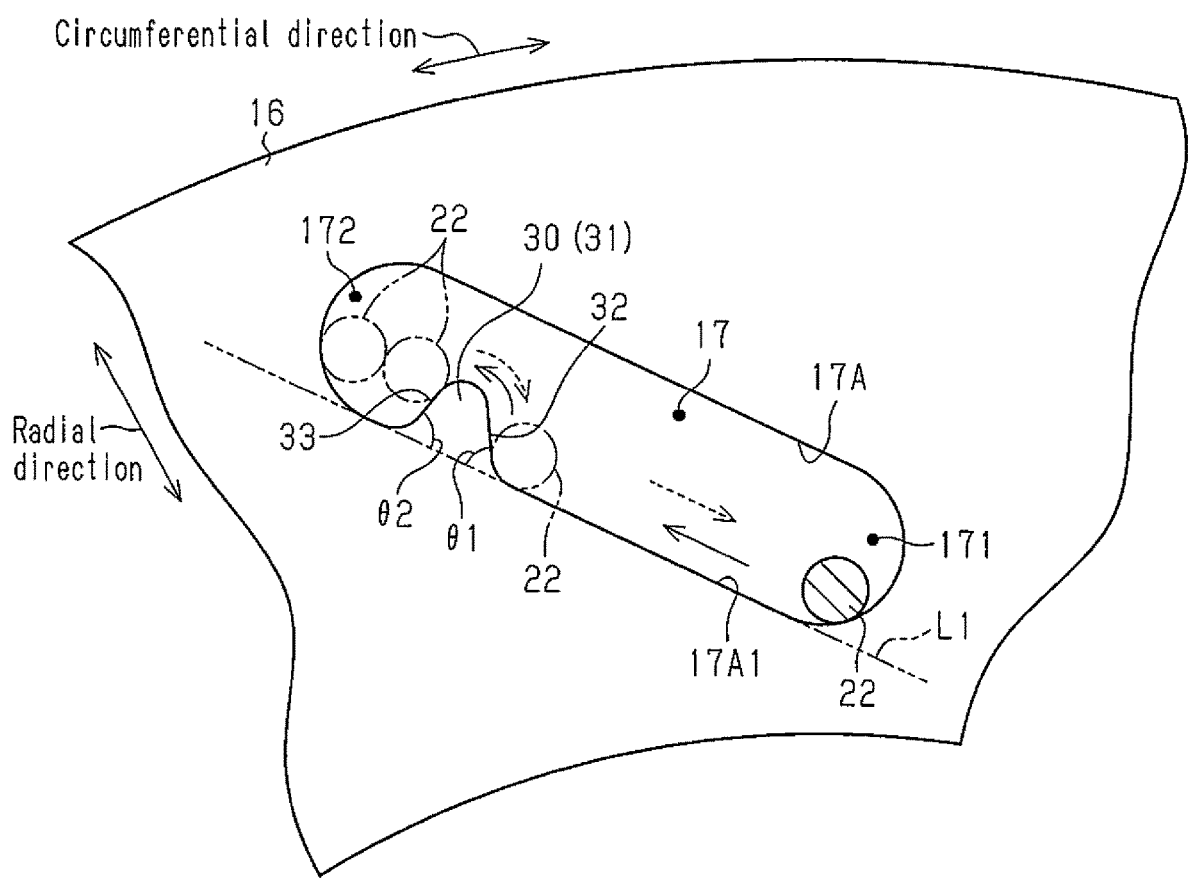
FIG. 3 is an enlarged plan view showing a guide hole in a blade of the air conditioning register.

As shown in FIGS. 2 and 3, each blade 16 is an arcuate plate. Each blade 16 is arranged so that a thickness-wise direction of each blade 16 corresponds to the axial direction of the tube 11. A guide hole 17 extends through a circumferentially middle portion of each blade 16. Referring to FIG. 3, one of the two ends of the guide hole 17 is referred to as the first end 171 (right end), and the other end (left end) is referred to as the second end 172. In this case, the first end 171 is located at the inner side of the second end 172 in the radial direction. The guide hole 17 is inclined relative to the circumferential direction and extended toward the inner side in the radial direction from the second end 172 toward the first end 171.

As shown in FIG. 2, a restriction member 18 is arranged between the blades 16 that are adjacent to each other in the circumferential direction. The three restriction members 18 are supported by the two case members 13 and 14 to restrict movement of the blades 16 in the circumferential direction and the radial direction. The restriction members 18 restrict movement of the blades 16 in the circumferential direction.

As shown in FIGS. 1 and 2, the air conditioning register 10 includes a transmission mechanism 20 that moves each blade 16 in the radial direction by transmitting, to each blade 16, power generated when an occupant rotates the operation ring 15. The transmission mechanism 20 includes shafts 22 supported by the operation ring 15. The number of the shafts 22 is the same as that of the blades 16.

Each shaft 22 extends in the axial direction of the tube 11 through the guide hole 17 of the corresponding blade 16. As shown in FIG. 1, the distal end (left end) of each shaft 22 is fixed to a first support 23. Further, a second support 24 is fixed at a position of each shaft 22 that is slightly separated from the corresponding blade 16 toward the basal end (right end). That is, each blade 16 is located between the first support 23 and the second support 24 of the corresponding shaft 22. Thus, the first support 23 and the second support 24 restrict movement of the blade 16 in the axial direction of the shaft 22.

Figure 4:
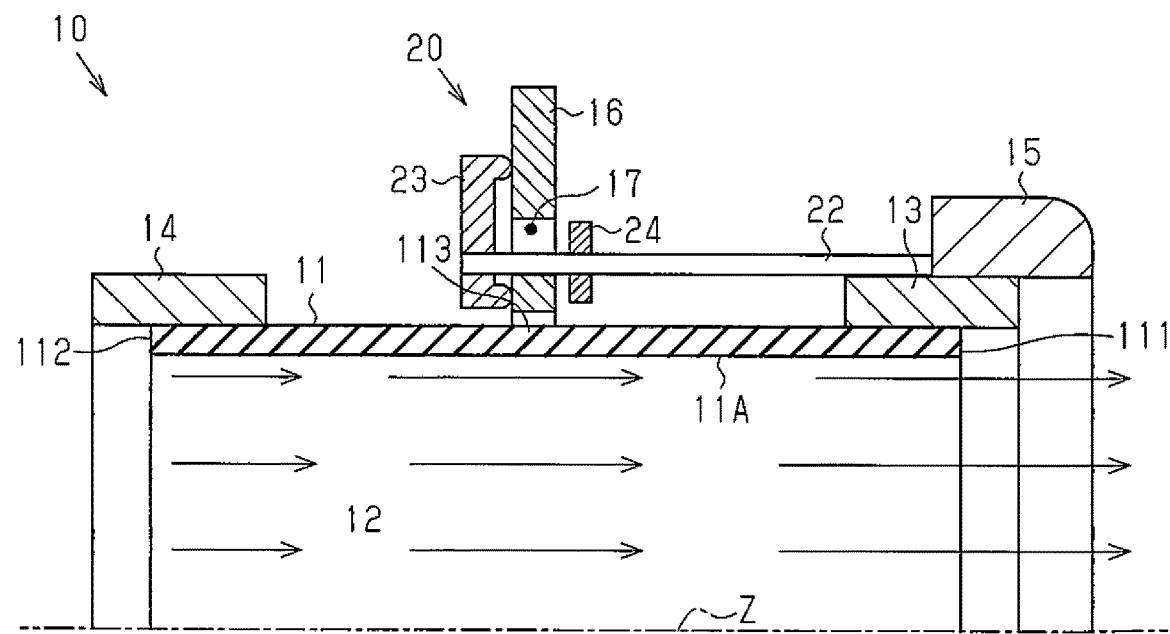
FIG. 4 is a cross-sectional view schematically showing a state in which the air conditioning register is in a spot airflow mode.
Figure 5:
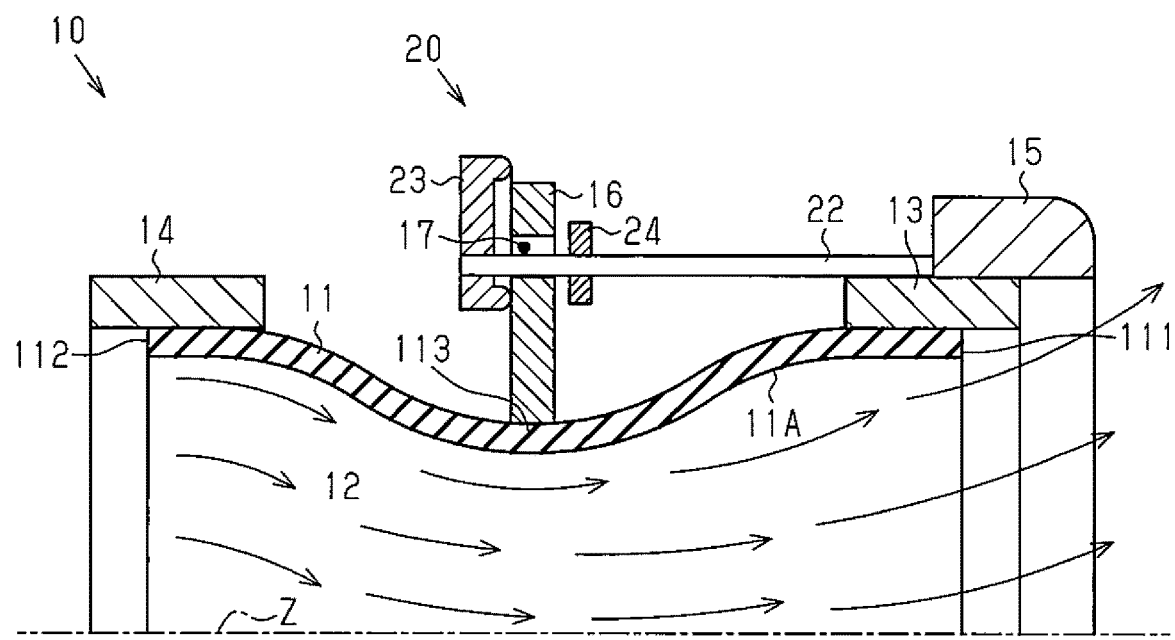
FIG. 5 is a cross-sectional view schematically showing a state in which the air conditioning register is in a diffusion airflow mode.

When the operation ring 15 is rotated in the circumferential direction, each shaft 22 moves in synchronization with the operation ring 15. Movement of each blade 16 in the circumferential direction is restricted by the restriction member 18. Thus, the blades 16 move in the radial direction. When the shaft 22 is located at the first end 171 of the guide hole 17 as shown by the solid line in FIG. 3, the blade 16 does not abut against an outer circumferential surface 11B of the tube 11 as shown in FIG. 4. When the operation ring 15 is rotated in the circumferential direction from the state shown in FIG. 3, the shaft 22 moves in the circumferential direction toward the second end 172 in the guide hole 17 as shown by the solid-line arrows. The blade 16 is pressed by the shaft 22 toward the inner side in the radial direction and moved toward the center axis Z of the tube 11. Then, the blade 16 abuts against the outer circumferential surface 11B of the tube 11 and presses the outer circumferential surface 11B. This elastically deforms and moves the predetermined portion 113 of the tube 11, which is pressed by the blade 16, toward the inner side in the radial direction as shown in FIG. 5. The blades 16 are arranged around the tube 11 in the circumferential direction. Thus, the diameter at the predetermined portion 113 is decreased. That is, the circumferential position of the circumferential surface of the predetermined portion 113 moves toward the center axis Z of the tube 11.

In a state in which the blade 16 presses the predetermined portion 113 of the tube 11, when the blade 16 further moves toward the inner side in the radial direction, the diameter at the predetermined portion 113 further decreases. When the shaft 22 reaches the second end 172 in the guide hole 17, the blade 16 does not further move toward the inner side in the radial direction. Thus, the diameter at the predetermined portion 113 is the smallest in this state, and the passage cross-sectional area of the predetermined portion 113 is the smallest.

When the operation ring 15 is rotated in the opposite circumferential direction from a state in which the shaft 22 is located at the second end 172, the shaft 22 moves in the circumferential direction toward the first end 171 in the guide hole 17 as shown by the broken-line arrows in FIG. 3. The resiliency of the tube 11 moves the blade 16 toward the outer side in the radial direction. Thus, the predetermined portion 113 of the tube 11 moves toward the outer side in the radial direction. This gradually increases the diameter at the predetermined portion 113. When the shaft 22 reaches the first end 171 in the guide hole 17, the blade 16 does not abut against the tube 11 as shown in FIG. 4. Thus, a pressing force is not applied from the blade 16 to the tube 11. In this case, the diameter at the predetermined portion 113 is substantially equal to that at the end 111 of the tube 11.

As shown in FIG. 3, the air conditioning register 10 includes a holding portion 30 that keeps the shaft 22 located closer to the second end 172 than the first end 171. The holding portion 30 is a projection 31 that projects toward the outer side in the radial direction from a radially inner circumferential wall 17A1 of the guide hole 17. The surface (right surface) of the projection 31 is a first inclined surface 32 facing the first end 171 and inclined toward the second end 172 in the circumferential direction to be closer to the second end 172 at positions located toward the outer side in the radial direction. The surface (left surface) of the projection 31 is a second inclined surface 33 facing the second end 172 and inclined toward the first end 171 in the circumferential direction to be closer to the first end 171 at positions located toward the outer side in the radial direction.

The straight line L1 shown by the broken line in FIG. 3 extends in a longitudinal direction of the guide hole 17. The inclination angle θ2 of the second inclined surface 33 relative to the longitudinal direction of the guide hole 17 and the inclination angle θ1 of the first inclined surface 32 relative to the longitudinal direction of the guide hole 17 are less than 90°. The inclination angle θ2 of the second inclined surface 33 is greater than the inclination angle θ1 of the first inclined surface 32. Thus, it is more difficult for the shaft 22 to move beyond the projection 31 when the shaft 22 moves from the second end 172 to the first end 171 than when the shaft 22 moves from the first end 171 to the second end 172.

The operation and advantage of the air conditioning register 10 of the present embodiment will now be described.

When each shaft 22 is located at the first end 171 of the corresponding guide hole 17, the three blades 16 do not abut against the tube 11 as shown in FIG. 4. Thus, a pressing force is not applied from each blade 16 to the tube 11. Accordingly, the diameter at the predetermined portion 113 of the tube 11 is substantially the same as the inner diameter at the end 111 of the tube 11. In this case, the diameter of the duct 12 at the inner side of the tube 11, that is, the radial position of the circumferential surface of the duct, does not change over the entire length of the duct 12. Further, in this case, air flows through the duct 12 along the inner circumferential surface 11A of the tube 11 toward the end of the duct 12 located proximate to the passenger compartment 100. As shown by the arrows in FIG. 4, this limits the spreading of the air blown out of the tube 11 toward the passenger compartment 100. The airflow mode that limits the spreading of air blown out of the tube 11 is referred to as the "spot airflow mode."

When the operation ring 15 is rotated by an occupant in a state in which air is blown out of the tube 11 into the passenger compartment 100 in the spot airflow mode, the shafts 22 are moved in the circumferential direction. Thus, when each shaft 22 presses the radially inner circumferential wall 17A1 of the corresponding guide hole 17, each blade 16 moves toward the inner side in the radial direction. As a result, as shown in FIG. 5, each blade 16 abuts against the predetermined portion 113 of the tube 11. Thus, each blade 16 presses the predetermined portion 113 of the tube 11. This decreases the diameter at the predetermined portion 113.

Even when the inner diameter at the predetermined portion 113 of the tube 11 decreases, the diameter at the end 111 of the tube 11 fixed to the first case member 13 does not decrease. Thus, when each blade 16 presses the predetermined portion 113, as shown in FIG. 5, the diameter of the duct 12 at the inner side of the tube 11, that is, the radial position of the circumferential surface of the duct, is the smallest at the portion corresponding to the predetermined portion 113 and gradually increases from the predetermined portion 113 of the tube 11 toward the end located proximate to the passenger compartment 100. As a result, as shown by the arrows in FIG. 5, the air that passes through the portion where the diameter of the duct 12 is the smallest spreads toward the outer side in the radial direction along the inner circumferential surface 11A of the tube 11 as the end of the duct 12 proximate to the passenger compartment 100 becomes closer. Thus, the air flowing through the duct 12 and blown out of the tube 11 into the passenger compartment 100 spreads easily. The airflow mode that facilitates the spreading of the air blown out of the tube 11 is referred to as the "diffusion airflow mode."

When switching the diffusion airflow mode to the spot airflow mode, the operation ring 15 is operated and rotated in the circumferential direction by an occupant so that the shaft 22 moves toward the first end 171 in the guide hole 17. When the operation ring 15 is rotated in this manner, the resiliency of the tube 11 moves each blade 16 toward the outer side in the radial direction. This increases the diameter at the predetermined portion 113 of the tube 11. When the shaft 22 reaches the first end 171 in the guide hole 17, each blade 16 does not abut against the tube 11 as shown in FIG. 4. This limits the spreading of the air blown out of the tube 11 into the passenger compartment 100.

In this manner, movement of each blade 16 located outside the duct 12 in the radial direction allows for the shifting between the spot airflow mode and the diffusion airflow mode. Thus, the vehicle occupant can change the air blow mode by operating the operation ring 15 without a member arranged in the duct to change the mode for blowing air into the passenger compartment 100.

Further, since there is no member in the duct 12 used to change the air blow mode, the efficiency for supplying air when air is blown in the spot airflow mode particularly increases as compared to an air conditioning register that includes a member in the duct to change the air blow mode. This increases the amount of air blown into the passenger compartment 100 with less power consumption and improves the efficiency for using energy in a vehicle.

Further, each restriction member 18 is arranged between the blades 16 that are adjacent to each other in the circumferential direction. Thus, when the rotation of the operation ring 15 moves each shaft 22 in the circumferential direction, movement of the blades 16 with the shafts 22 is restricted. As a result, the movement of each shaft 22 when the vehicle occupant rotates the operation ring 15 efficiently moves each blade 16 in the radial direction.

In addition, the radially inner circumferential wall 17A1 of the guide hole 17 includes the projection 31 that keeps the shaft 22 located closer to the second end 172 than the first end 171 in the guide hole 17. Thus, the shaft 22 engages the second inclined surface 33 of the projection 31 after the vehicle occupant stops operating the operation ring 15 after moving the shaft 22 to the second end 172 by operating the operation ring 15. More specifically, when the operation ring 15 is rotated to move the blade 16 toward the inner side in the radial direction, the shaft 22 abuts against the first inclined surface 32 of the projection 31. The first inclined surface 32 is inclined to be closer to the second end 172 at positions located toward the outer side in the radial direction. Thus, when the operation ring 15 is further operated, the shaft 22 moves beyond the projection 31. This arranges the shaft 22 between the projection 31 and the second end 172 in the guide hole 17. When the shaft 22 is located between the projection 31 and the second end 172 in this manner, the shaft 22 engages the second inclined surface 33 of the projection 31. Thus, even when each blade 16 receives the resilient force of the tube 11, the shaft 22 remains closer to the second end 172 than the first end 171. This restricts movement of the blade 16 toward the outer side in the radial direction while countering the resiliency of the tube 11. As a result, air is continuously blown in the diffusion airflow mode.

Further, the second inclined surface 33 of the projection 31 is inclined to be closer to the first end 171 at positions located toward the outer side in the radial direction. Thus, when the operation ring 15 is rotated, the shaft 22 moves from between the projection 31 and the second end 172 toward the first end 171 in the guide hole 17. In this manner, rotation of the operation ring 15 moves the blade 16 toward the outer side in the radial direction. This moves the shaft 22 beyond the projection 31 to the first end 171 and disengages the second inclined surface 33 of the projection 31 from the shaft 22. The inclination angle $\theta 1$ of the first inclined surface 32 of the projection 31 and the inclination angle $\theta 2$ of the second inclined surface 33 of the projection 31 are less than 90°. Thus, even when an occupant operates the operation ring 15 to move the shaft 22 from the first end 171 to the second end 172 in the guide hole 17 or from the second end 172 to the first end 171 in the guide hole 17, rotation of the operation ring 15 in the circumferential direction moves the shaft 22 beyond the projection 31.

It should be apparent to those skilled in the art that the present invention may be embodied in many other specific forms without departing from the spirit or scope of the invention. Particularly, it should be understood that the present invention may be embodied in the following forms.

As long as movement of the shafts 22 in the circumferential direction moves the blades 16 in the radial direction and deforms the tube 11, the blades 16 may be allowed to be moved by a certain amount in the circumferential direction.

The inclination angle θ2 of the second inclined surface 33 of the projection 31 may be less than or equal to the inclination angle θ1 of the first inclined surface 32 of the projection 31 as long as engagement with the shaft 22 keeps the shaft 22 located closer to the second end 172 than the first end 171 in the guide hole 17.

The holding portion 30 may have any shape other than the shape of the projection 31 as long as the holding portion 30 keeps the shaft 22 located closer to the second end 172 than the first end 171 in the guide hole 17. For example, the holding portion 30 may be a recess located in the radially inner circumferential wall 17A1 of the guide hole 17. In this case, when the shaft 22 that is moving in the circumferential direction is received in the recess, the shaft 22 engages a circumferential surface of the recess. This keeps the shaft 22 closer to the second end 172 than the first end 171 in the guide hole 17. This structure also separates the shaft 22 from the recess and moves the blade 16 in the radial direction when the operation ring 15 is rotated by a vehicle occupant.

In the above embodiment, the radially inner circumferential wall 17A1 of the guide hole 17 includes only one projection 31, which keeps the shaft 22 located closer to the second end 172 than the first end 171. However, a further projection that is separate from the projection 31 may be arranged between the projection 31 of the radially inner circumferential wall 17A1 and the first end 171. In this case, the further projection keeps the shaft 22 located between the first end 171 of the guide hole 17 and the projection 31. This structure allows for adjustment of the degree of air spreading in the passenger compartment 100. The number of projections may be three or more.

Figure 6:
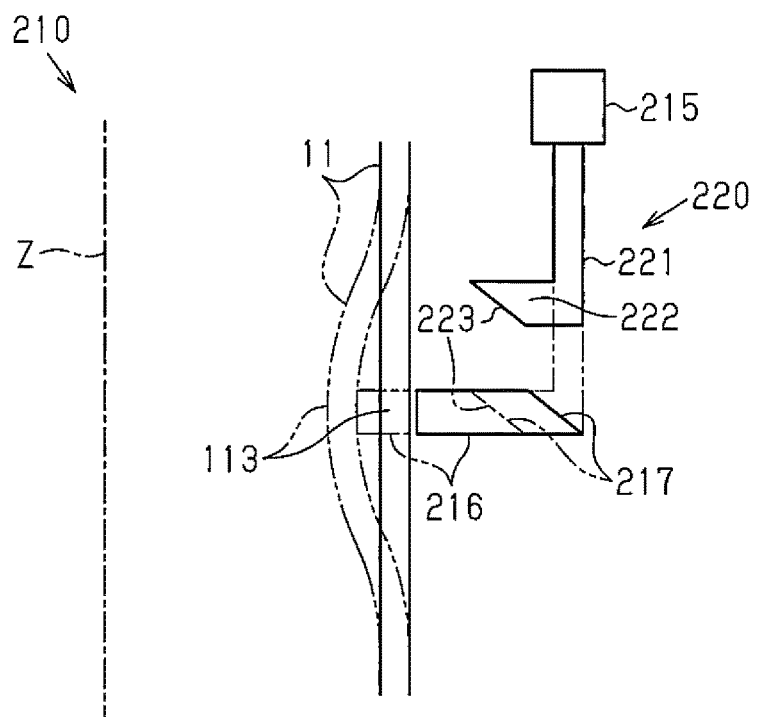
FIG. 6 is a schematic view showing a transmission mechanism and a tube in another embodiment of the air conditioning register.

As long as a transmission mechanism of an air conditioning register moves each blade 16 in the radial direction by transmitting power resulting from movement of an operation member to the blade 16, the transmission mechanism 20 does not have to be structured as described in the above embodiment. FIG. 6 shows an example of an air conditioning register including another transmission mechanism. As shown in FIG. 6, an air conditioning register 210 includes an operation member 215 that moves in an axial direction (vertical direction) of the tube 11. The air conditioning register 210 includes a transmission mechanism 220 that transmits the power resulting from axial movement of the operation member 215 to blades 216. The transmission mechanism 220 includes a transmission member 221 extending in the axial direction and including an upper end that is fixed to the operation member 215. The transmission member 221 includes a lower end having a claw 222 that projects toward the inner side (left side) in the radial direction. The claw 222 includes a distal end surface (left end surface) serving as an action surface 223 inclined toward the outer side (right side) in the radial direction at positions located farther from the operation member 215. Further, a surface of each blade 216 located at the outer side in the radial direction is an inclined surface 217 that is inclined toward the outer side in the radial direction at positions located farther from the operation member 215.

When the operation member 215 moves in the axial direction, the action surface 223 of the claw 222 is abutted against and pressed by the inclined surface 217 of each blade 216 as shown by the broken line in FIG. 6, the claw 222 presses the blade 216 toward the inner side in the radial direction. As a result, the blade 216 moves toward the inner side in the radial direction and presses the predetermined portion 113 of the tube 11. This deforms the tube 11 so that the diameter of the predetermined portion 113 decreases. This structure also changes the mode for blowing air out of the tube 11 and into the passenger compartment 100 by moving each blade 216 located outside the duct 12.

As long as blades are moved in the radial direction, an air conditioning register may include an electric actuator that moves the blades. In this case, the actuator is operated to change the radial position of each blade. This changes the shape of the duct 12 located inside the tube 11 and changes the mode for blowing air out of the tube 11 and into the passenger compartment 100.

Further, when the electric actuator is used to move the blades, each blade may be moved by a single actuator. Alternatively, a plurality of actuators that respectively correspond to the blades may be arranged. When using a plurality of actuators, the radial positions of the blades are separately controlled. This allows air to be blown out of the tube 11 and into the passenger compartment 100 in a number of modes.

Figure 7:
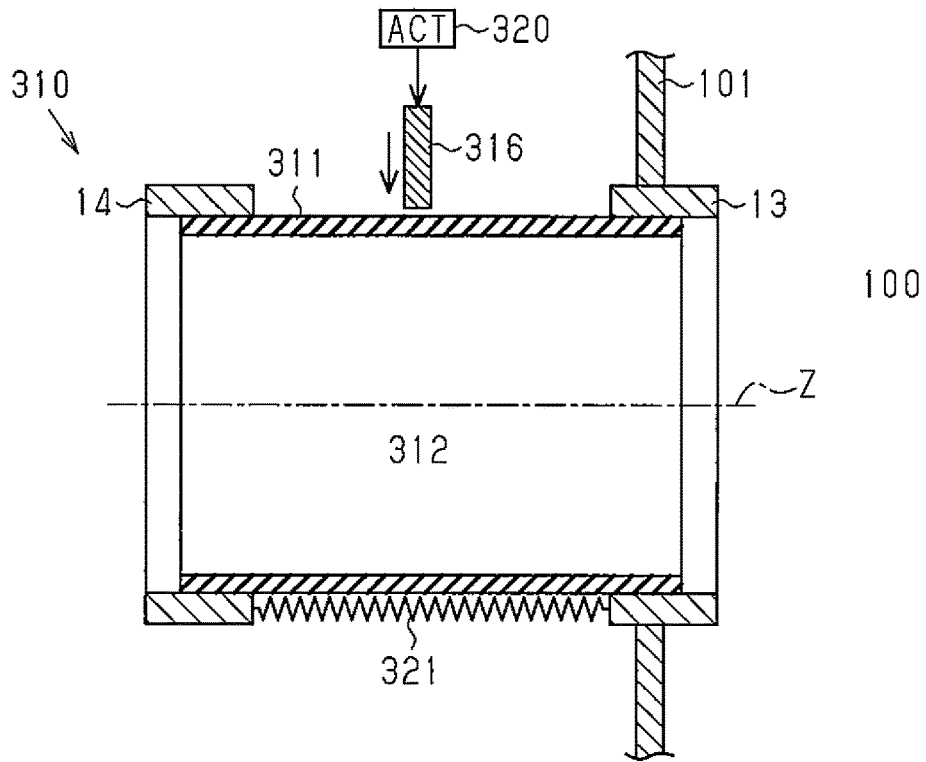
FIG. 7 is a cross-sectional view schematically showing a further embodiment of the air conditioning register.

As long as a tube is pressed and deformed by blades, the tube does not have to be formed from elastomer and may be formed from another flexible material. FIG. 7 shows an example of an air conditioning register 310 including a tube 311. In this example, blades 316 are moved by an actuator 320. The air conditioning register 310 shown in FIG. 7 includes a plurality of biasing members 321 located between the blades 316 that are adjacent to each other. Each biasing member 321 biases the first case member 13 and the second case member 14 away from each other and applies tension to the tube 311.

In this structure, when each blade 316 moves toward the inner side of the tube 311 in the radial direction, a portion of the tube 311 pressed by the blade 316 is moved toward the inner side in the radial direction against the tension of the tube 311. The second case member 14 moves against a biasing force of each biasing member 321 and shortens the distance between the second case member 14 and the first case member 13. Even when the blade 316 moves, the first case member 13 and the second case member 14 limit deformation of two ends of the tube 311. That is, this structure deforms the portion of the tube 311 pressed by the blade 316 against the tension of the tube 311 and changes the shape of a duct 312 without greatly deforming the two ends of the tube 311. Thus, the mode for blowing air blown into the passenger compartment 100 can be changed using the inclination of an inner circumferential surface of the tube 311 from the portion of the tube 311 that is pressed and deformed by the blade 316 to the end located proximate to the passenger compartment 100. When the blade 316 moves toward the outer side in the radial direction, the portion of the tube 311 pressed by the blade 316 is moved toward the outer side in the radial direction by the tension of the tube 311. The biasing force of the biasing member 321 moves the second case member 14 to increase the distance between the second case member 14 and the first case member 13.

Figure 8:
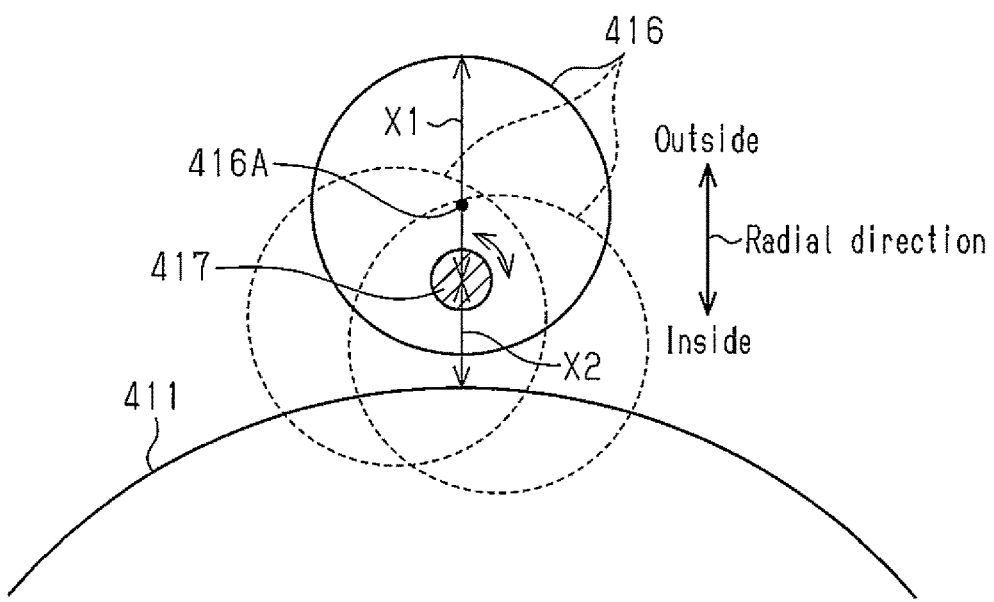
FIG. 8 is a schematic view showing a blade in still another embodiment of an air conditioning register and a blade movement mode.
Figure 9:
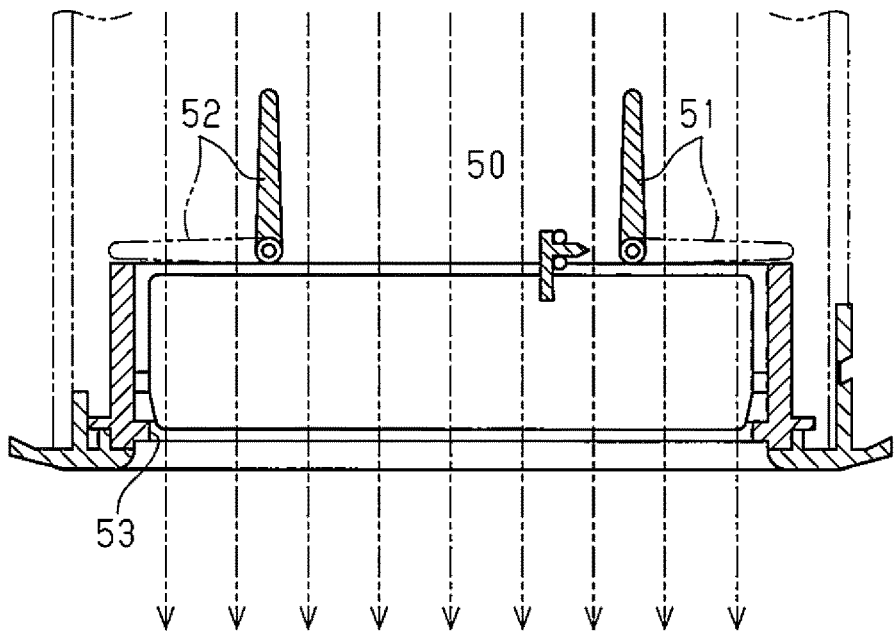
FIG. 9 is a cross-sectional view schematically showing a state in which a conventional air conditioning register is in a spot airflow mode.
Figure 10:
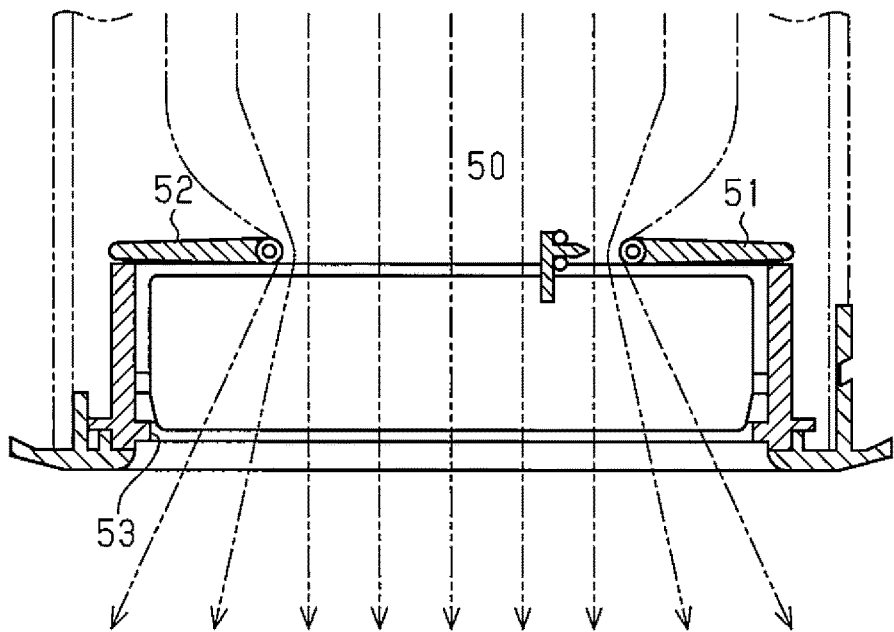
FIG. 10 is a cross-sectional view schematically showing a state in which the conventional air conditioning register is in a diffusion airflow mode.

As long as a tube is deformed by movement of blades, the blades may be moved in a direction that differs from the radial direction. For example, as shown in FIG. 8, disk-shaped blades 416 extending in an axial direction of a tube 411 may be supported by shafts 417 to be rotatable in the direction shown by the arrows. In this case, each blade 416 is supported by the corresponding shaft 417 at a position that differs from the center 416A. In addition, when X1 represents the length of a straight line extending from the center of the shaft 417 through the center 416A to an outer circumferential surface of the blade 416 and X2 represents the shortest distance from the center of the shaft 417 to an outer circumferential surface of the tube 411, the first length X1 is greater than the second length X2. In this structure, rotation of the shaft 417 rotates the blade 416 about the shaft 417 as shown by the broken line in FIG. 8. In this manner, when rotation of the blade 416 changes the distance from the center axis of the tube 411 to the blade 416, the tube 411 is deformed, and a duct located inside the tube 411 is changed in shape.

As long as the shapes of a tube and a duct located inside the tube are changed by movement of blades, any number of blades may be arranged. Further, when the tube is pressed by a plurality of blades, the blades may be located at different positions in an axial direction of the tube.

As long as the inner side of a tube functions as a duct, the tube does not have to be cylindrical and may be box-shaped.

The present examples and embodiments are to be considered as illustrative and not restrictive, and the invention is not to be limited to the details given herein, but may be modified within the scope and equivalence of the appended claims.

The invention claimed is:

1. An air conditioning register comprising:
a tube, wherein an inner side of the tube functions as a duct;
a plurality of blades located at an outer side of the tube and spaced equally around the outer side of the tube in a circumferential direction of the tube, each blade of the plurality of blades having an arcuate shape and being located at a middle position in an axial direction of the tube; and
a transmission mechanism that comprises means for pressing each of the plurality of blades to change a distance from the blade to a center axis of the tube, wherein
the transmission mechanism is configured such that each blade of the plurality of blades (i) can be spaced apart from the tube and (ii) moves when pressed on to change the distance from the blade to the center axis of the tube; and
movement of each blade of the plurality of blades presses, with the blade from the outer side, a portion of the tube at the middle position and changes the duct in shape.

2. The air conditioning register according to claim 1, wherein the tube is formed from an elastic material and includes a first end and a second end, the air conditioning register further comprising:
a first case member to which the first end of the tube is fixed, wherein the first case member limits deformation of the first end; and
a second case member to which the second end of the tube is fixed, wherein the second case member limits deformation of the second end.

3. The air conditioning register according to claim 2, wherein
when the plurality of blades moves toward the center axis of the tube, a passage cross-sectional area of the duct decreases at the portion of the tube that is pressed by the plurality of blades.

4. An air conditioning register comprising:
a tube, wherein an inner side of the tube functions as a duct and the tube includes a first end and a second end;
a blade located at an outer side of the tube, the blade being configured to move to change a distance from the blade to a center axis of the tube;
a first case member to which the first end of the tube is fixed, wherein the first case member limits deformation of the first end;
a second case member to which the second end of the tube is fixed, wherein the second case member limits deformation of the second end; and
a biasing member that applies tension to the tube and biases the first case member and the second case member away from each other, wherein
movement of the blade presses, with the blade from the outer side, a portion of the tube between the first and second ends in an axial direction of the center axis and changes a shape of the duct.

5. An air conditioning register comprising:
a tube, wherein an inner side of the tube functions as a duct;
a blade located at an outer side of the tube, the blade being configured to move to change a distance from the blade to a center axis of the tube;
an operation member located at the outer side of the tube in a radial direction, wherein the operation member is rotatable in a circumferential direction of the tube;
a transmission mechanism that moves the blade by transmitting power resulting from rotation of the operation member to the blade; and
a restriction member located at two sides of the blade in the circumferential direction, wherein the restriction member restricts movement of the blade in the circumferential direction, wherein
movement of the blade presses, with the blade from the outer side, a portion of the tube between two ends of the tube in an axial direction of the center axis and changes a shape of the duct,
the blade includes a guide hole,
the guide hole is inclined relative to the circumferential direction to gradually extend toward an inner side in the radial direction from one of two ends of the guide hole in the circumferential direction to the other end, and
the transmission mechanism includes a shaft coupled to the operation member and inserted through the guide hole.

6. The air conditioning register according to claim 5, further comprising a holding portion, wherein
one of two longitudinal ends of the guide hole, located at the inner side in the radial direction, is a first end,
the other one of the longitudinal ends, located at the outer side in the radial direction, is a second end, and
the holding portion keeps the shaft located closer to the second end than the first end in the guide hole.

7. The air conditioning register according to claim 6, wherein
the holding portion is a projection that projects toward the outer side in the radial direction from a radially inner circumferential wall of the guide hole,
the projection includes a surface facing the first end and inclined toward the second end in the circumferential direction to be closer to the second end at positions located toward the outer side in the radial direction,
the projection includes a surface facing the second end and inclined toward the first end in the circumferential direction to be closer to the first end at positions located toward the outer side in the radial direction, and the projection engages the shaft on the surface facing the second end and keeps the shaft located closer to the second end than the first end.

* * * * *